US007625158B2

(12) United States Patent
Forlong

(10) Patent No.: US 7,625,158 B2
(45) Date of Patent: Dec. 1, 2009

(54) CLAMPING ASSEMBLY

(76) Inventor: Murray Houlton Forlong, 1599 State Highway 17, Dairy Flat, Auckland (NZ)

( * ) Notice: Subject to any disclaimer, the term of this patent is extended or adjusted under 35 U.S.C. 154(b) by 308 days.

(21) Appl. No.: 11/859,061

(22) Filed: Sep. 21, 2007

(65) Prior Publication Data

US 2008/0075545 A1 Mar. 27, 2008

(30) Foreign Application Priority Data

Sep. 22, 2006 (NZ) .................................. 550065

(51) Int. Cl.
*B23B 41/14* (2006.01)
(52) U.S. Cl. .............................. 408/10; 408/12; 408/13; 408/95; 219/121.58
(58) Field of Classification Search ............... 408/8–13, 408/16, 51, 95, 97, 98; 219/121.18, 121.39, 219/121.58; 228/44.3; 83/375; *B23B 47/28, B23B 49/00, 47/18, 41/14*
See application file for complete search history.

(56) References Cited

U.S. PATENT DOCUMENTS

| | | | | |
|---|---|---|---|---|
| 4,865,494 A | * | 9/1989 | Gudow | 408/13 |
| 5,123,789 A | * | 6/1992 | Ohtani et al. | 408/1 R |
| 5,258,698 A | * | 11/1993 | Piovano et al. | 318/569 |
| 5,539,966 A | * | 7/1996 | Aufiero | 29/26 A |
| 6,309,151 B1 | * | 10/2001 | Sacchetti | 409/131 |
| 7,252,462 B2 | * | 8/2007 | Suzuki et al. | 408/95 |

FOREIGN PATENT DOCUMENTS

JP 11347818 A * 12/1999

* cited by examiner

*Primary Examiner*—Daniel W Howell
(74) *Attorney, Agent, or Firm*—Young & Thompson

(57) ABSTRACT

A clamping assembly for clamping a product to allow drilling and/or cutting of the product by a drilling or cutting assembly, the clamping assembly including control means, activation means, moving means and clamp foot means being operatively connected whereby the control means controls the activation means to control the torque and distance moved on the activation means and moving means such that any movement of the drilling or cutting or clamp assembly relative to each other can be controlled such that the depth of and timing of drilling or cutting and or clamping by the drilling or cutting or clamping assembly can be adjusted accordingly such that if the product being clamped by the clamp foot means is moved during any additional forces that occur during drilling or cutting, then the control means can compensate and ensure the drilling or cutting depth is maintained.

10 Claims, 3 Drawing Sheets

CLAMPING ASSEMBLY

The invention relates to a clamping assembly for drilling and cutting machines. The invention is directed particularly but not solely towards a clamping assembly for cutting metal plate in combination with a drilling means and or plasma cutting torch.

BACKGROUND OF INVENTION

Normally when plate and sheet drilling and cutting machines are used to drill and or cut plate, the plate or product being drilled or cut has to be held or clamped by clamping assembly on any support surface such as a table, at least minimally during the drilling or cutting. In this case the drill or cutter is independently driven by a motor which is raised and lowered by a servo motor. And the clamping assembly is driven down by pneumatic or hydraulic means and guided by linear bearings.

Most clamping assemblies have a measuring means which comprises a linear measuring device which is used to determine the position of the top of the plate to be drilled with respect to the bottom of the drill so that the drill only goes down a set distance. This linear measuring device is often a linear Variable Displacement transducer (LVDT) or via a rack and pinion driving an encoder. This measuring device works by measuring the length of the extension of the clamp cylinders, and therefore the top of the plate to be machined.

There are problems with this type of arrangement whereby the drilling and clamping actions are independent which cause problems in sequencing whereby delays occur while waiting for the clamping before drilling can commence.

The clamp assembly includes an air or hydraulic cylinder which is attached to a clamp foot means which in turn leads to a clamp plate which abuts/pushes with a clamp force on the product to be drilled or cut eg a plate or sheet. The clamp foot must be driven down with the clamp cylinders to precede the drill so that the plate is clamped prior to drilling or machining commencing. The clamping force is set by setting the air or hydraulic cylinder pressure.

The linear measuring is time consuming and can be inaccurate. Problems can also arise when the clamping causes deflection of the plate which can effect the linear measure distance which is not able to pick up such small changes which still can greatly effect drilling where by the plate may not be drilled or cut.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT OF THE INVENTION

It is an object of the invention to provide an improved clamping assembly that ameliorates some of the disadvantages and limitations of the known art or at least provide the public with a useful choice.

SUMMARY OF INVENTION

In a first aspect the invention comprises in a clamping assembly for clamping a product to allow drilling and/or cutting of the product by a drilling or cutting assembly having a drilling tool or cutter, the clamping assembly including control means, activation means, moving means and clamp foot means being operatively connected whereby the control means controls the activation means to control the torque and distance moved on the activation means and moving means such that any movement of the drilling or clamp assembly relative to each other can be controlled such that the depth of and timing of the drilling or cutting and/or clamping by the drilling or cutting or clamping assembly can be adjusted accordingly such that if the product being clamped by the clamp foot means is moved during any additional forces that occur during drilling, then the control means can compensate and ensure the drilling depth is maintained whereby as the control means allows for precise movement between the drilling and clamping assemblies, movements such as vertically moving the clamp foot means down towards the product to be drilled or cut can occur simultaneously with the movement of the drilling assembly such that the clamping assembly leads the drilling tool or cutter by a known amount and conversely the retraction of the clamp foot means can occur simultaneously with the retraction of the drill once the drill has retracted clear of the product being drilled or cut.

Preferably, the activation means is a servo motor.

Preferably, the control means is servo based closed loop control system.

Preferably, the moving means is a ball screw guided by linear bearings.

Preferably, the clamp foot means comprises a planar member shaped to allow a drill or cutter at least partially therethrough and still able to be held onto any said product.

Preferably the assembly includes support means and power means.

Preferably the drilling or clamping assemblies are operatively connected together and to their own activation means, moving means and vertical linear guides.

Preferably the drilling or cutting assembly is operatively connected to the clamping assembly and is housed with the clamping assembly in the support means.

Preferably clamping and drilling assembly are operatively supported by a gantry to allow movement in different horizontal directions.

In a second aspect the invention comprises in a drilling and clamping assembly for drilling and/or cutting of an unclamped product, the assembly including having control means, activation means, moving means, drilling means and clamp foot means being operatively connected whereby the control means controls the activation means to control the torque on the activation means and moving means so that the product is clamped according to a torque such that the depth of and timing of drilling can be adjusted accordingly such that if the product being clamped by the clamp foot means is moved during any additional forces that occur during drilling or cutting, then the control means can compensate and ensure that the drilling or cutting depth of the drilling or cutting means is maintained.

Preferably, the activation means is a motor.

Preferably, the control means is servo based closed loop system.

Preferably, the moving means is a ball screw guided by linear bearings.

Preferably, the clamp foot means comprises a planar member shaped to allow a drill or cutter at least partially therethrough and still able to be held onto any said product.

Preferably the assembly includes a clamping assembly and a drilling or cutting assembly each having activation means, moving means and control means.

Preferably clamping assembly has a clamp foot means to clamp the product.

Preferably the drilling assembly has a drilling or cutting means.

Preferably the assemblies are housed in a support means and connected to power means.

In a third aspect the invention comprises a drilling and clamping assembly for drilling and/or cutting of unclamped product, the assembly including having control means, activation means, moving means, drilling means clamp foot means being operatively connected whereby the control means controls the activation means to control the feed of both the drilling or cutting and clamping so that they can be co-ordinated so that they can move down up a vertical distance simultaneously and safely as the control means ensures the vertical distance is precisely known, so that during the start of the drill cycle, the clamp foot means leads the drill tool to ensure the clamping occurs just before drilling commences, conversely at the completion of the drill cycle, the drill tool or cutter needs to retract out of the hole created, prior to the clamp foot means retracting and once the drill or cutter is out of the hole, the clamp foot means and drill tool or cutter can retract simultaneously to save on the cycle time.

BRIEF DESCRIPTION

The invention will now be described, by way of example only, by reference to the accompanying drawings.

DESCRIPTION OF THE INVENTION

The following description will describe the invention in relation to preferred embodiments of the invention, namely a clamping assembly. The invention is in no way limited to these preferred embodiments as they are purely to exemplify the invention only and that possible variations and modifications would be readily apparent without departing from the scope of the invention.

Figure 1:
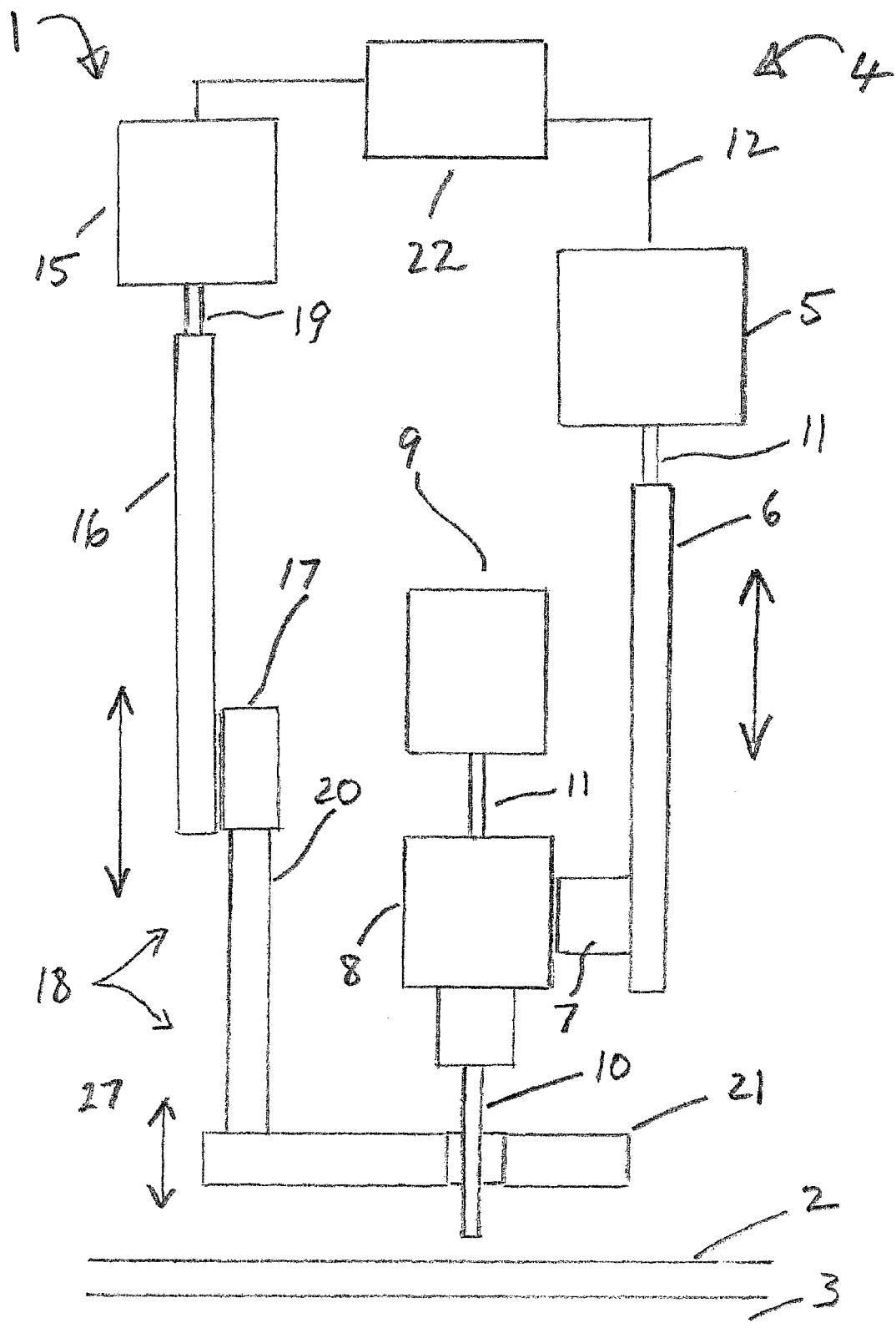
FIG. 1 is a schematic representation of the clamp foot assembly in accordance with a first preferred embodiment of the invention.

FIG. 1 is a schematic showing a clamping assembly 1 which can be used to hold any product such as a plate 2 to any suitable support 3 so that a drilling or cutting assembly 4 can carry out its function of drilling and/or cutting.

Drilling or cutting assembly 4 includes a first activation means (for example a servo mechanism including drive and motor) 5 operatively connected to a moving means (for example a ball screw or hydraulic cylinder) 6 which is in turn connected to second moving means (for example vertical linear guides) 7 and spindle 8 having a drilling means such as a drilling tool at its lower end which is then operatively connected to second activation means (for example a motor) 9 which in turn is operatively connected to a drill cutting means or a plasma or oxy-fuel cutting torch 10. Motor 9 can be called a spindle motor which is as shown is mounted on the spindle so as to be able to move as part of the drilling assembly in the vertical axis or plane 27.

Each of the components is operatively via connecting means 11 connected together to allow them to operate to cause the drill to drill and/or the cutter (for example drill tool or plasma or oxy-fuel cutting torch) and are also operatively via connecting means 12 connected to the clamping assembly 1.

Clamp assembly 1 includes the following components of a third activation means (servo mechanism including a drive and motor) 15, a first moving means (for example a ball screw or hydraulic cylinder) 16, second moving means (for example a vertical linear guide) 17 and clamp foot means 18, via a connecting means 19 which allows and enables the clamp assembly 1 to clamp by moving the clamp foot 18 to hold plate 2 with out moving to allow said drilling and/or cutting. Activation means 15 which can include a servo controlled motor and clamp foot means can include clamp foot 20 and an operatively connected holding means 21. Holding means 21 can include any shape as long as it can clamp and allow for co-ordination with the drilling and or cutting. For example means 21 can be ring shaped as shown or be merely recessed Connecting means 12 (as shown in FIG. 1) allows the clamp assembly 1 and drilling and/or cutting assembly 4 to be coordinated, in that movement of the clamp assembly 1 can be timed and sequenced to allow the drilling assembly 4 or vice versa to be activated to drill/cut or not to cause rotation and/or to allow any other movement such as translatory movement of the clamping assembly and/or drill and/or cutting assembly to be replicated in each other as required.

Connection means can include such control means 22 (see FIG. 1) that allows such coordinated or not, movement of both assemblies. Control means 22 can include electronic means such as wire or wireless connection with a screen/console and/or computer, and servo based mechanism which can include the gearing and motors each for the clamping and drilling assemblies. the control means 22 is servo based closed loop control system.

The control means 22 controls the activation means to control the torque and distance moved on all the activation means (first, second and third) and moving means such that any movement of the drilling or clamping assembly relative to each other can be controlled such that the depth of and timing of drilling and or clamping by the drilling or clamping assembly can adjust accordingly such that if the product being clamped by the clamp foot means is moved during any additional forces that occur during drilling, then the control means 22 can compensate and ensure the drilling is maintained.

Also as the control means 22 allows for precise movement between the drilling and clamping assemblies, movements such as vertical moving the clamp foot means down towards the product to be drilled can occur simultaneously with the movement of the drill assembly 4 such that the clamping assembly 1 leads the drilling tool by a known amount and conversely the retraction of the clamp foot means can occur simultaneously with the retraction of the drill once the drill tool has retracted clear of the product being drilled.

With any large drilling and plasma cutting machines (not shown), in use when a plate 2 on the support such as a table 3 is to be drilled, clamping assembly 1 moves down and holds the plate 2 down, while the drill 10 comes down and drills plate 2.

The servo mechanism 15 which includes a controlled motor which drives ball screw 16 to clamp the plate 2. Clamp foot means 18 is electronically geared whereby the spindle drill head 10 can come down at the same time or in any specified variation, so that the clamp foot means 18 clamps, plate 2 at any specified time for a specified duration before the drilling begins, resulting in the speedily coordinated drilling and clamping to occur.

The torque or force on clamp motor 15 can be electronically controlled which can be made to be proportional to the clamp force being used on the plate 2. However due to the force on the plate during drilling, when the clamp foot means 18 is clamping plate 2, there is an additional force which can cause the plate to be deflected down. This plate deflection affects the depth of drilling on a plate 2 if the top of plate 2 is set as the depth control, which subsequently moved. With this servo controlled clamp foot means 18, any deflection or movement of the plate 2 can be dynamically monitored and compensated for whereby the drill depth can be adjusted accordingly.

When moving from drill site to drill site (eg hole to hole), we can select the distance up off the plate we want the clamp foot means to move, rather than retracting the clamp foot all the way, away from the plate 2. This can save processing time. There is absolute control of the drilling and clamping process whereby both clamping and drilling can be carried out in the vertical plane in a controlled and coordinated manner. The control means can then compensate and ensure the drilling depth is maintained from underneath the surface of the clamp foot means 18.

When drilling multiple holes on one plate 2, once the drill has finished a hole, it must retract above the plate 2 and the clamp foot means must raise off the plate 2 prior to any horizontal movement (or the drill will be broken off). Due to the control means, coordination or gearing of drilling/cutting with clamping can occur in the vertical plane. The drilling or cutting machine can begin moving to the next hole to be drilled once the drill is above the bottom surface of the clamp foot means and the clamp foot means is off the plate 2. For example by waiting until the clamp foot means has raised by a specific amount say 100 mm above the plate. Similarly on the clamping of the next hole, the drill can follow the clamp foot down to the plate 2. This gearing between the clamp foot and the drill reduces the hole to hole time of drilling.

In summary the drilling and clamping assembly for drilling and/or cutting of an unclamped product, includes control means 22, activation means, moving means, drilling means and clamp foot means 18 being operatively connected together so that the control means 22 controls the activation means to control the feed of both the drilling and clamping so that they can be co-ordinated so that they can move down up simultaneously a vertical distance and safely as the control means ensures the vertical distance is precisely known, so that during the start of the cycle, the clamp foot means 21 leads the drill tool to ensure the clamping occurs just before drilling commences. Conversely at the completion of the drill cycle, the drill tool needs to retract out of the hole created in plate 2, prior to the clamp foot means retracting. Once the drill tool is out of the hole, the clamp foot means 18 and drill tool can retract simultaneously to save the cycle time.

Figure 3:
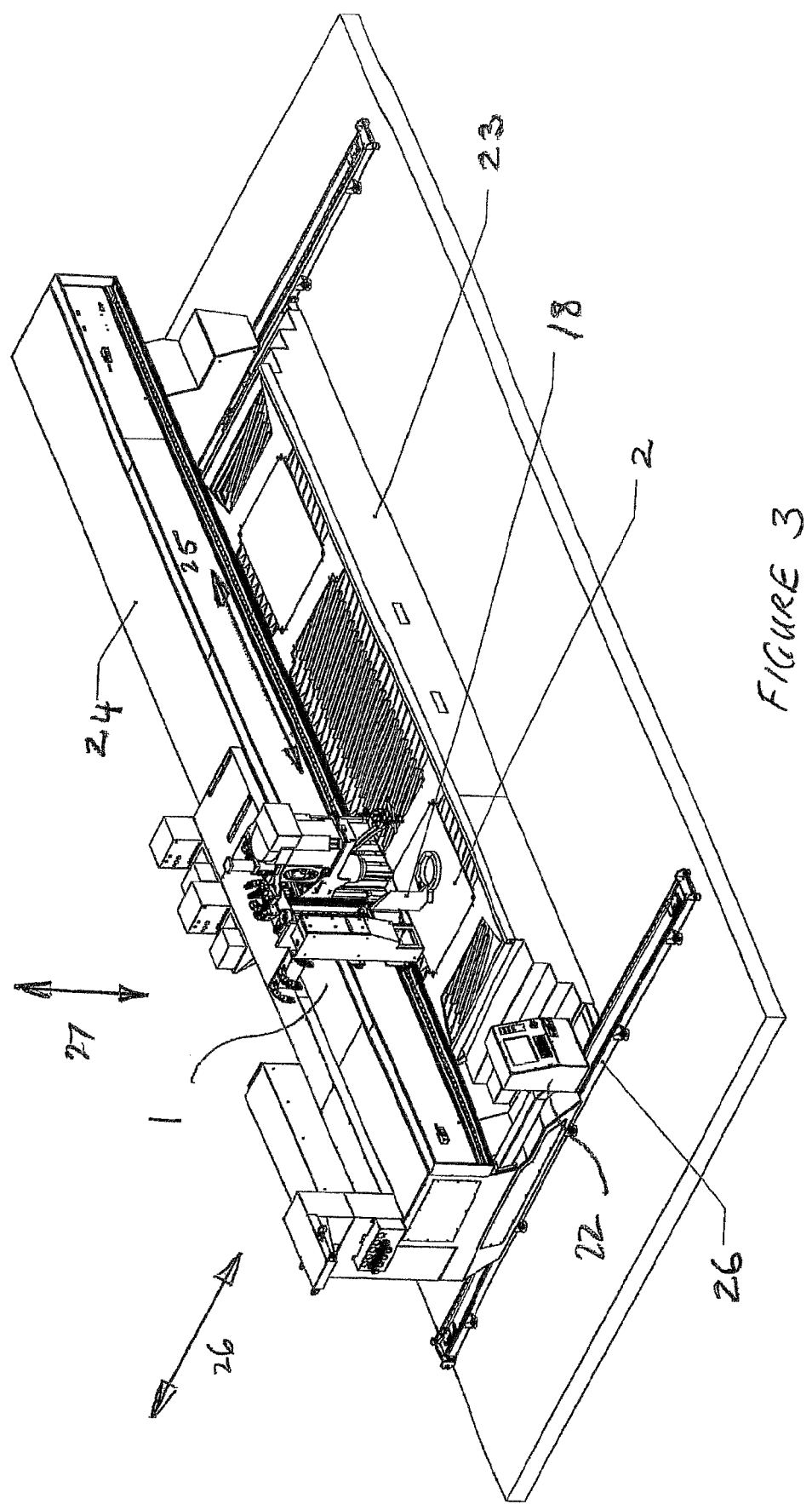
FIG. 3 is an upper perspective view of clamping assembly and drilling on a traveling apparatus.

As shown in FIG. 3 clamping assembly 1 and drilling and/or cutting assembly 4 can be used or operated as part of a mechanised cutting table 23 which shows part of the control means 22 being a console whereby assemblies 1 and 4 are slidably mounted on a gantry 24 which allows movement or travel in the Y axis 25 and X axis 26 in the horizontal plane as shown.

Figure 2:
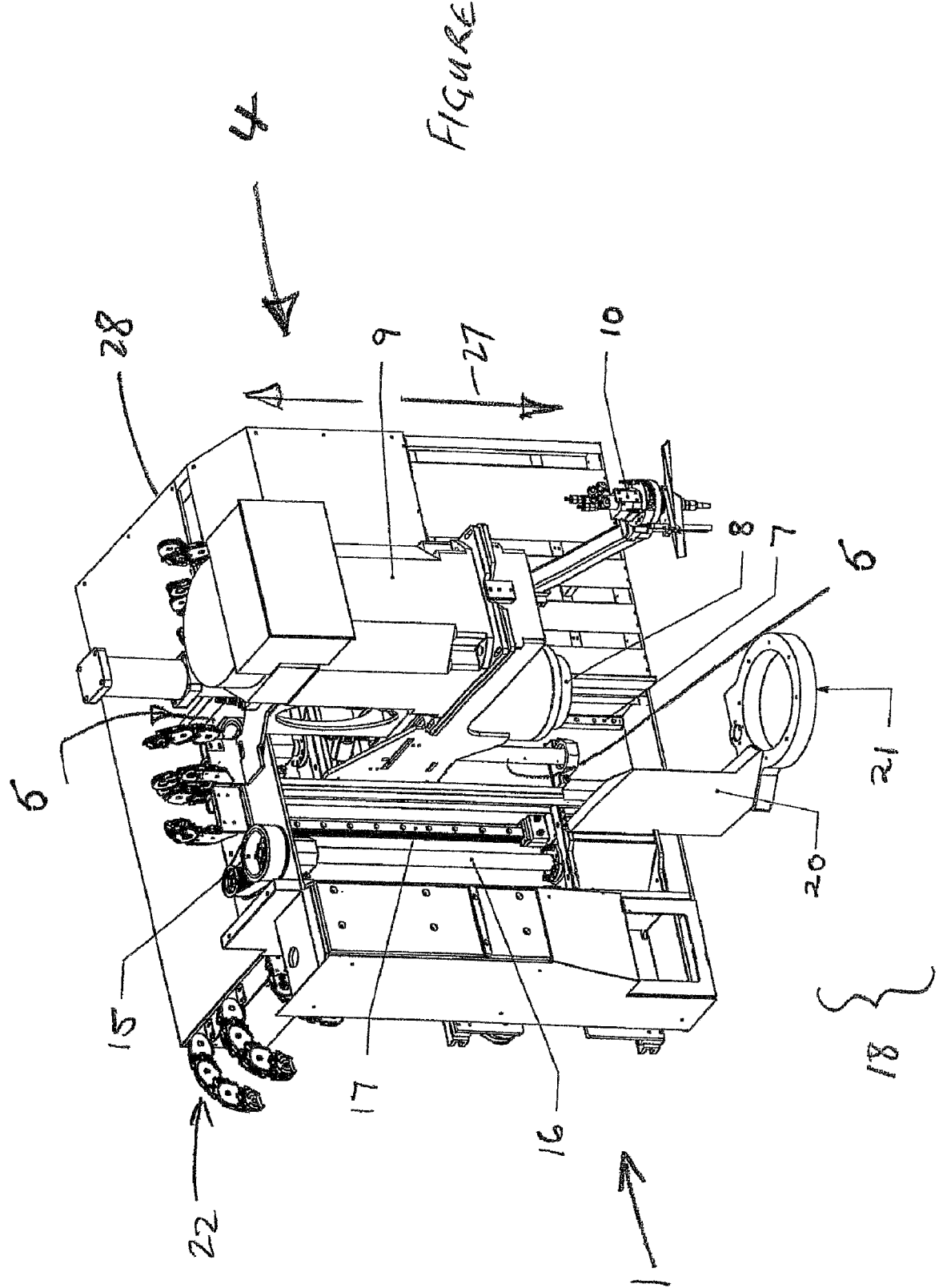
FIG. 2 is an upper perspective close up view of the clamping assembly and drilling assembly.

As shown in FIGS. 2 and 3 other components which though not specifically described, may also be used to connect and operate the drilling or cutting assembly 4 and the clamping assembly are also included though not specifically described. For example the drive can include gearing such as chain belt and shaft mechanisms as shown in FIG. 2. Also shown is a support structure 28 such as a housing which can be shaped to suit the clamping assembly and or drilling cutting assembly and any movement or travel or access or protection as required.

Advantages
a) Coordinated control of both clamping and drilling/cutting
b) Clamping can be accurately set.
c) Drilling and/or cutting depth can be accurately set.
d) Can allow for plate deflection or movement.
e) Plate always gets drill or cut.
f) Active control of clamping, cutting/cutting independently as required
g) Able to adjust drilling/cutting depth during drilling/cutting.
h) Tine saving in such coordinated control.
i) Retraction of clamping distance can be minimised.
j) Electronic control is extremely accurate
k) Electronic control enables remote control.
l) Able to be computer linked.

Variations

Throughout the description of this specification, the word "comprise" and variations of that word such as "comprising" and "comprises", are not intended to exclude other additives, components, integers or steps.

Whenever cutting is mentioned, any other action can also be carried out such as for example drilling.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

To those skilled in the art to which the invention relates, many changes in construction and widely differing embodiments and applications of the invention will suggest themselves without departing form the scope of the invention as defined in the appended claims. The disclosures and the description herein are purely illustrative and are not intended to be in any sense limiting.

What I claim is:

1. A clamping assembly for clamping a product to allow drilling and/or cutting of the product by a drilling or cutting assembly having a drill tool or cutter, the clamping assembly including control means, activation means, moving means and clamp foot means being operatively connected whereby the control means controls the activation means to control the torque and distance moved on the activation means and moving means such that any movement of the drilling or clamping assembly relative to each other can be controlled such that the depth of and timing of drilling or cutting and/or clamping by the drilling or cutting or clamping assembly can be adjusted accordingly such that if the product being clamped by the clamp foot means is moved during any additional forces that occur during drilling or cutting, then the control means can compensate and ensure the drilling or cutting depth is maintained whereby as the control means allows for precise movement between the drilling or cutting and clamping assemblies, movements such as vertically moving the clamp foot means down towards the product to be drilled or cut can occur simultaneously with the movement of the drill assembly such that the clamping assembly leads the drilling tool or cutter by a known amount and conversely the retraction of the clamp foot means can occur simultaneously with the retraction of the drill or cutter once the drill or cutter has retracted clear of the product being drilled or cut.

2. The clamping assembly as claimed in claim 1 wherein, the activation means is a servo motor.

3. The clamping assembly as claimed in claim 2 wherein, the control means is servo based closed loop control system.

4. The clamping assembly as claimed in claim 3 wherein, the moving means is a ball screw guided by linear bearings.

5. The clamping assembly as claimed in claim 4 wherein, the clamp foot means comprises a planar member shaped to allow a drill or cutter at least partially therethrough and still able to be held onto any said product.

6. The clamping assembly as claimed in claim 5 wherein, the assembly includes support means and power means.

7. The clamping assembly as claimed in claim 6 wherein, a drilling or cutting assembly is operatively connected to the clamping assembly and is housed with the clamping assembly in the support means.

8. The clamping assembly as claimed in claim 7 wherein, the drilling and clamping assemblies are operatively connected together and to their own activation means, moving means and vertical linear guides.

9. The clamping assembly as claimed in claim 8 wherein the assemblies are housed in a support means and connected to power means.

10. The clamping assembly as claimed in claim 9 wherein the control means controls all the activation means to control the feed of both the drilling or cutting and clamping so that they can be co-ordinated so that they can move down up a vertical distance simultaneously and safely as the control means ensures the vertical distance is precisely known, so that during the start of a drill or cut cycle, the clamp foot means leads the drill tool or cutter to ensure the clamping occurs just before drilling or cutting commences, conversely at the completion of the drill or cut cycle, the drill tool or cutter needs to retract out of the hole created, prior to the clamp foot means retracting and once the drill tool or cutter is out of the hole, the clamp foot means and drill tool or cutter can retract simultaneously to save on the cycle time.

* * * * *